United States Patent [19]

Granger

[11] Patent Number: 4,744,746

[45] Date of Patent: May 17, 1988

[54] INJECTION MOLDING APPARATUS

[75] Inventor: Bryce C. Granger, Ravenna, Ohio

[73] Assignee: McNeil-Akron, Inc., Akron, Ohio

[21] Appl. No.: 913,718

[22] Filed: Sep. 30, 1986

[51] Int. Cl.⁴ ............................................. B29B 11/06
[52] U.S. Cl. .................................... 425/563; 425/564; 425/594
[58] Field of Search .............................. 425/562–566, 425/594

[56] References Cited

U.S. PATENT DOCUMENTS

| | | | |
|---|---|---|---|
| 3,270,115 | 8/1966 | Nouel | 425/563 X |
| 3,642,403 | 2/1972 | Havlik | 425/563 X |
| 3,741,704 | 6/1973 | Beasley | 425/563 X |
| 3,788,522 | 1/1974 | Mercer | 222/146 R |
| 3,813,814 | 5/1974 | Muerin | 425/564 X |
| 4,315,727 | 2/1982 | Black | 425/563 X |
| 4,334,847 | 6/1982 | Schauffle | 425/566 X |
| 4,389,358 | 6/1983 | Hendry | 425/562 X |

OTHER PUBLICATIONS

"Injection Moulding-Programmed On Success" Klöckner Ferromatik Desma GmbH, p. 10, Feb. 1985.

Primary Examiner—Charles Hart
Attorney, Agent, or Firm—Renner, Kenner, Greive, Bobak & Taylor

[57] ABSTRACT

Injection molding apparatus (10) for processing and transferring molding material from a feed mechanism (30) to a nozzle (75) for discharging into a mold including a bolster (12), an injection head (11) extending through the bolster, an injection barrel (37) in the injection head for containing a predetermined sized shot of the molding material, a plunger (46) movable in the injection barrel for discharging the shot of molding material into the mold, a bore (47) extending longitudinally of the plunger for loading molding material into the barrel, feed mechanism (30) supplying molding material to the bore of the plunger irrespective of the position of the plunger, and a valve (60) closing the bore upon movement of the plunger in one direction for discharging the shot of molding material and opening the bore upon movement of the plunger in the other direction for discharging the barrel with a predetermined shot of molding material. The apparatus may include an auxiliary mechanism (90) for supporting the feed mechanism at a location displaced from the plunger to maintain the feed mechanism substantially perpendicular to the direction of movement of the plunger.

18 Claims, 5 Drawing Sheets

INJECTION MOLDING APPARATUS

TECHNICAL FIELD

The invention relates generally to injection molding apparatus. More particularly, the invention relates to injection molding apparatus for processing and transferring molding material from a feed mechanism to a nozzle for discharging the material into a mold. More specifically the invention relates to improved apparatus for uniquely supplying material from a feed mechanism into a barrel for discharge into a mold as a shot.

BACKGROUND ART

There are a great variety of injection molding machines which have been developed over the years. These machines are adapted for manufacture of numerous products including various types of molded rubber parts and rubber/metal components, shoe soles or shoe parts, and multi component parts and hollow bodies. Such injection molding machines have been adapted not only for forming extensive numbers of parts of molded rubber and other elastomers but also for thermoplastic, polyurethane and other plastic components.

In general, these machines have in common the injection of a measured shot of elastomer or other material into a mold cavity where the material sets or is cured in conformance with the mold configuration. Thereafter products which are manufactured in an injection molding machine are removed from the mold, the injection molding machine is recharged with another shot of molding material and the material is again discharged into the same or a different mold cavity. The art is highly refined with respect to the heating or cooling of the molding material being supplied, the application of molding pressures and temperatures, and related operations to optimize the speed and reliability of the equipment and process for the particular application by way of the type of product and the constituents of the molding material.

The transfer and storage of the molding material from an external source until its injection into the mold has been handled in a number of different ways. In general, for products involving short molding times and rapid rates of injection, it is common to employ what is termed a reciprocating screw injection device wherein a screw aligned axially of the nozzle transfers the molding material to a chamber between the screw and the nozzle and the screw reciprocates for the discharge of the molding material from the chamber and to recharge the chamber with molding material prior to a subsequent injection stroke. In applications involving longer production intervals, as for example necessitated by higher temperature and pressure requirements, it is common to employ an injection plunger with a feedscrew supplying molding material to a chamber from which the material is injected into a mold. Machines of this type generally have the plunger operating in a barrel in which the chamber is formed. The molding material is normally introduced into the chamber through an aperture in the barrel located at the end of the chamber proximate the nozzle. This location permits the feeding of the molding material into the chamber to effect withdrawal of the plunger during the loading of the chamber with a shot of molding material. As a result, the plunger can carry out its reciprocating motion through the actuation of a relatively noncomplex single stroke cylinder attached thereto.

These injection plunger feedscrew loading machines have been subject to certain disadvantages or limitations in the form in which they are constructed in industrial use. Due to the location of introduction of the molding material into the chamber the first molding material engaging the plunger becomes the last molding material to be ejected from the chamber. In some instances the chamber is elongated below the point of introduction of the molding material or the nozzle may be substantially elongated to extend through a bolster and platen of an injection molding machine. As a result portions of a shot of the molding material may remain in the chamber or in the nozzle bore for an injection and curing cycle prior to being injected into the mold. In such instances this molding material may assume highly different flow and curing characteristics due to the fact that it may have been subjected to a precure or extent of curing due to heat transfer from the mold and platen through the nozzle and the barrel surrounding the chamber. These characteristics can readily result in products having nonuniform characteristics or even structural defects which may result in a substantial incidence of scrap or waste.

An additional disadvantage of these injection plunger feedscrew loading machines is that, with the location of the introduction of molding material at the extremity of the chamber proximate the nozzle, the common upright type injection molding machine normally has the plunger and the actuating cylinder therefor positioned atop the upper bolster of the machine. With machines capable of ejecting shots of any substantial volume, the height of the machines may reach such substantial proportions such that they may be installed in only a limited number of facilities where there is a substantial ceiling height.

DISCLOSURE OF THE INVENTION

Therefore, an object of the present invention is to provide injection molding apparatus in which the first molding material introduced into the chamber of a barrel for a plunger injection machine is the first material discharged outwardly through the nozzle into the mold when a shot is discharged by the apparatus. Another object of the present invention is to provide such injection molding apparatus wherein the flow of molding material from the feedscrew into the chamber and thereafter through the nozzle into a mold is via a single unidirectional path. Yet another object of the present invention is to provide such injection molding apparatus which will achieve the above and the following objects while retaining the advantages of conventional injection plunger feedscrew loading type machines.

Another object of the present invention is to provide injection molding apparatus wherein a substantial portion of the barrel forming the chamber may be positioned within the upper bolster and platen of an injection molding machine. Still another object of the invention is to provide such apparatus with a barrel which in being thus positioned has the chamber in close proximity to the mold. Yet another object of the invention is to provide such apparatus with a barrel which in being thus positioned may have a nozzle of extremely limited axial extent, such that substantially all of the molding material which remains within the nozzle subsequent to discharge of a shot may be cured during the curing cycle from the close proximity to the molds and platens whereby the molding material within the nozzle may be removed with the molded part and subsequently trimmed off. A still further object of the present invention is to provide such apparatus wherein the barrel in being thus positioned may be provided with suitable temperature control channels of an essentially conventional design such that, although a substantial portion of the molding material is cured in the nozzle and removed with the product, any remaining molding material in the nozzle and molding material subsequently introduced into the chamber is not subjected to a sufficient extent of heating to effect the flow and curing characteristics of the molding material during the subsequent injection into a mold.

Another object of the present invention is to provide injection molding apparatus wherein the overall performance of the machine is improved. Yet another object of the invention is to provide injection molding apparatus wherein the parts of and the interrelation between the feeding mechanism and injection head assembly are such that cleaning is greatly facilitated. A still further object of the invention is to provide injection molding apparatus wherein due to the ease of cleaning and adjusting the shot volume discharged the apparatus may conveniently be employed for job shop applications which may run substantial numbers of different products employing a number of different molding compounds.

Still another object of the present invention is to provide injection molding apparatus having an auxiliary drive system for the feedscrew mechanism which assures controlled translating motion of the feedscrew mechanism by effecting positive movement of the extremity of the feedscrew mechanism opposite the plunger. Still another object of the invention is to provide injection molding apparatus wherein the number of component joints which are subject to injection pressure is reduced and the component joints which are subject to the pressure of the feedscrew mechanism are of rigid, durable construction, thus minimizing the possibilities of escape of molding material at various junctures. Yet a further object of the invention is to provide injection molding apparatus which may have reduced manufacturing costs and ease of operation, servicing and repair.

In general, the present invention contemplates injection molding apparatus for processing and transferring molding material from a feed mechanism to a nozzle for discharging into a mold including a bolster, an injection head extending through the bolster, an injection barrel in the injection head for containing a predetermined sized shot of the molding material, a plunger movable in the injection barrel for discharging the shot of molding material into the mold, a bore extending longitudinally of the plunger for loading molding material into the barrel, the feed mechanism supplying molding material to the bore of the plunger irrespective of the position of the plunger, and a valve closing the bore upon movement of the plunger in one direction for discharging the shot of molding material and opening the bore upon movement of the plunger in the other direction for discharging the barrel with a predetermined shot of molding material. The apparatus may include an auxiliary mechanism for supporting the feed mechanism at a location displaced from the plunger to maintain the feed mechanism substantially perpendicular to the direction of movement of the plunger.

PREFERRED EMBODIMENT FOR CARRYING OUT THE INVENTION

Figure 1A:
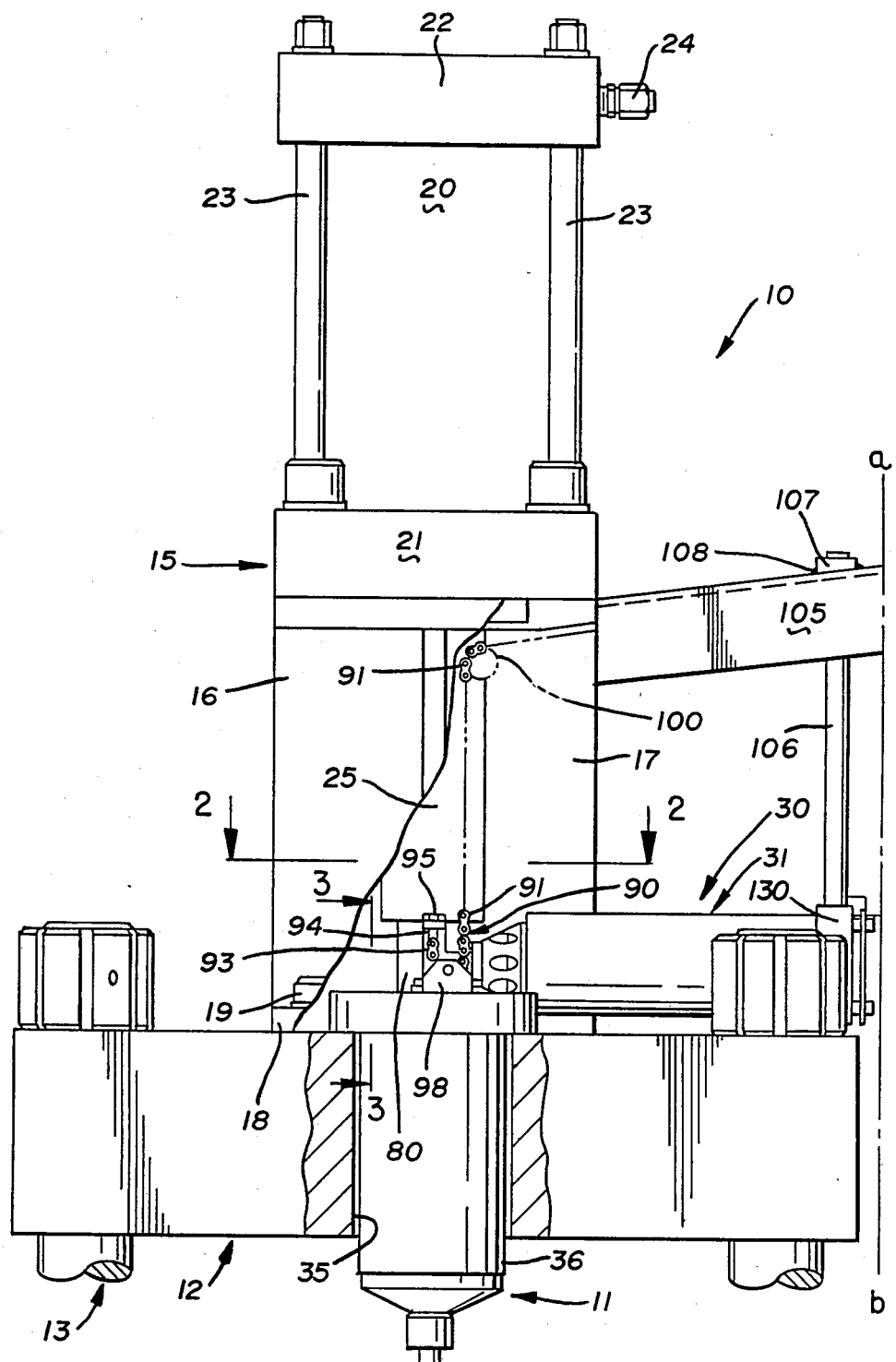
FIGS. 1a and 1b, on two sheets, line a-b of FIG. 1a joining with line a'-b' of FIG. 1b, comprise a fragmentary side elevational view with portions broken away of injection molding apparatus embodying the concepts of the present invention.
Figure 1B:
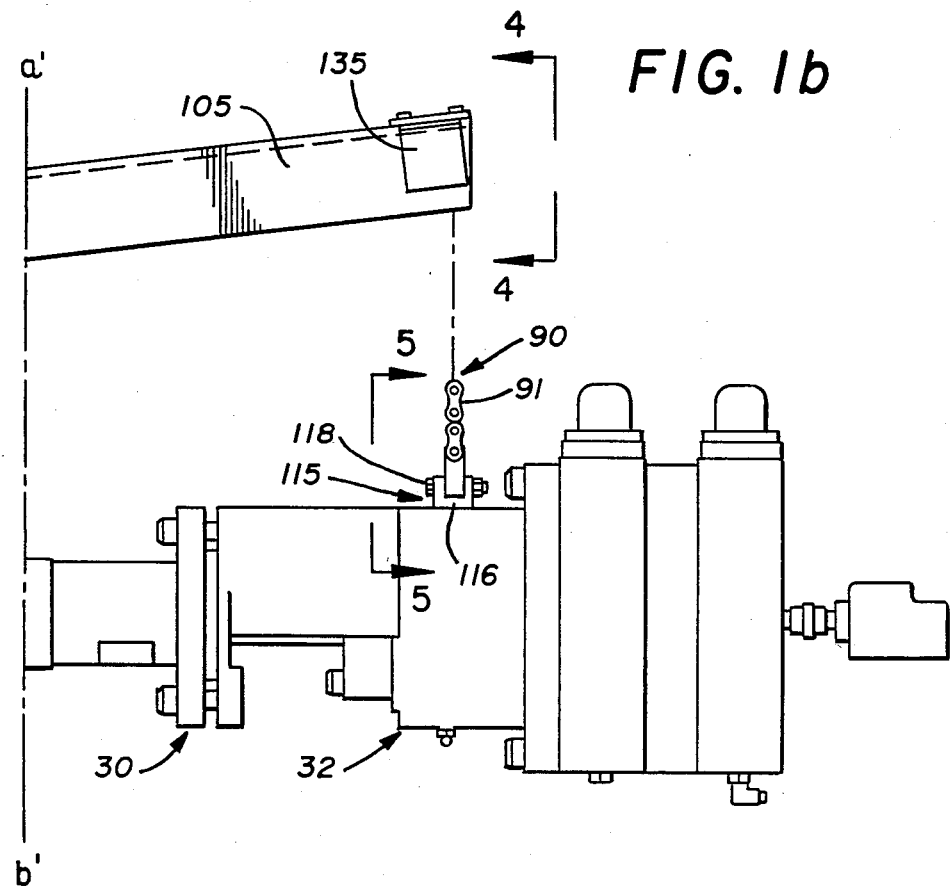

Exemplary injection molding apparatus embodying the concepts of the present invention is depicted by the numeral 10 in FIGS. 1a and 1b of the drawings. It will be appreciated by persons skilled in the art that the depiction of injection molding apparatus 10 includes only those portions of an injection molding machine which are pertinent to an understanding of the concepts of the present invention.

As shown, the injection molding apparatus 10 includes an injection head assembly, generally indicated by the numeral 11. The injection head assembly 11 is positioned in and extends through a bolster, generally indicated by the numeral 12, of the injection molding apparatus 10. Also extending through the bolster 12 are a plurality of strain rod assemblies, generally indicated by the numeral 13. As will be appreciated by persons skilled in the art, there are normally four strain rod assemblies 13 which interconnect the bolster 12 with a second or lower bolster (not shown) which is disposed a distance therefrom. Interposed between the bolster 12 and the second bolster are platens (not shown) which are suitably attached to the bolsters and which receive mold sections (not shown) which are designed to interfit with the platens and to interengage with the injection head assembly 11. The bolsters effect the well known function of supporting the platens for the selective application of heat to the mold, with the strain rods 13 effecting an application of pressure to the bolsters, platens and mold such as to control separation of the components during an injection of a shot of molding material from the injection head assembly 11 into the mold.

Figure 2:
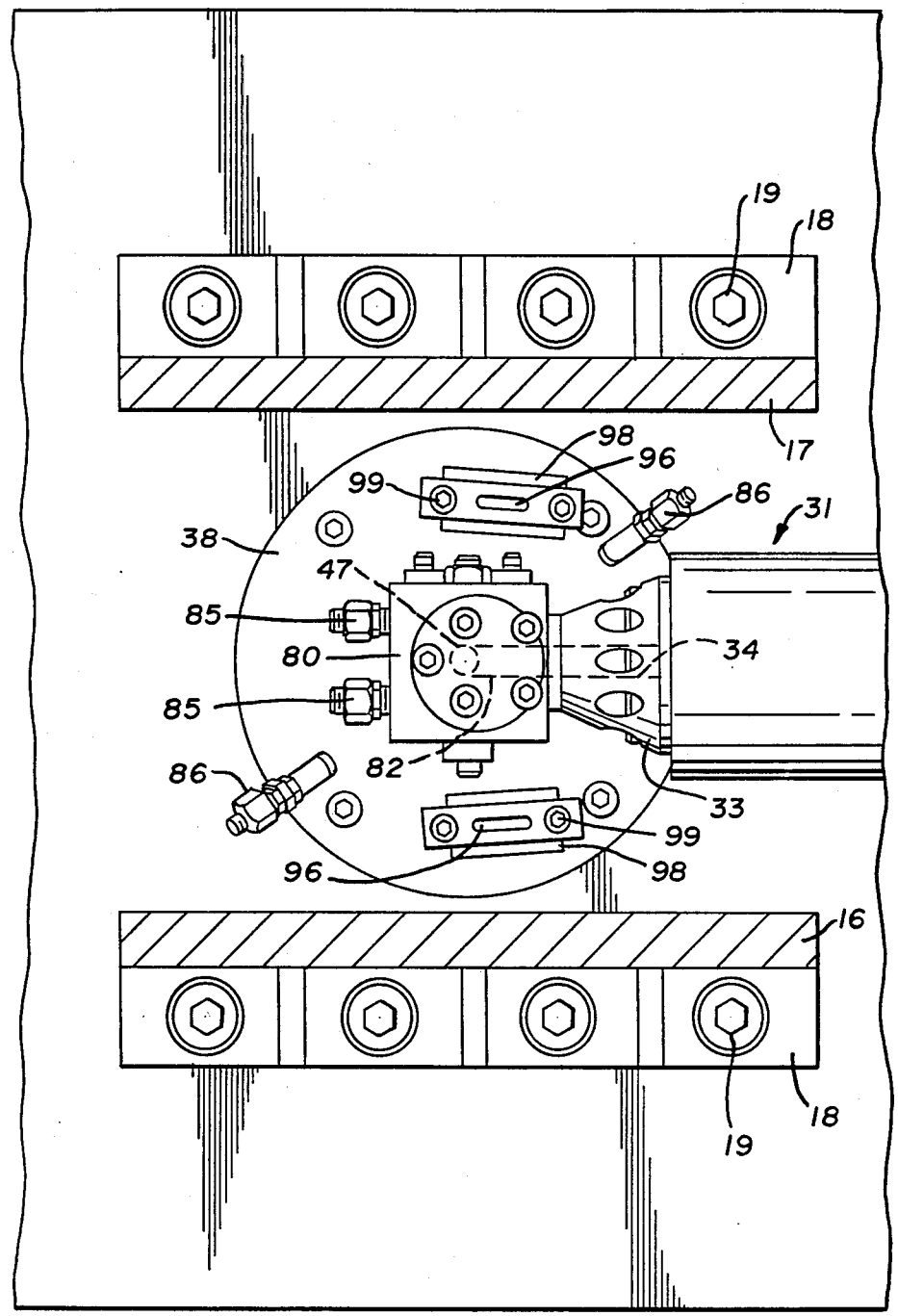
FIG. 2 is a fragmentary top plan view taken substantially along the line 2—2 of FIG. 1 and depicting particularly the interrelation between the feedscrew mechanism and the injection head assembly.

The injection molding apparatus 10 has proximate the upper portion of the injection head assembly 11 atop the bolster 12 as viewed in FIG. 1a an injection cylinder assembly, generally indicated by the numeral 15. As seen in FIGS. 1a and 2 the injection cylinder assembly 15 has a pair of upstanding side plates 16 and 17 disposed to either side of the injection head assembly 11 and preferably substantially parallel. The plates 16 and 17 may each conveniently have an attachment flange 18 adapted to receive cap screws 19 or other fasteners which rigidly affix the plates 16, 17 to the bolster 12.

The upper portion of side plates 16 and 17 mounts an injection cylinder 20. The injection cylinder 20 has a head end 21 which may be directly affixed to the upper extremities of the plates 16, 17. The cylinder 20 at the extremity opposite the head end 21 may have a cap end 22. In addition, cylinder 20 may have suitable tie rods 23 in accordance with conventional construction in the art. The cap end 22 of cylinder 20 is provided with a suitable fitting 24 for purposes of controlling the ingress and egress of fluid for operating the piston (not shown) of the cylinder 20 as a single acting piston, the required operation in accordance with the present invention as will be apparent hereinafter. The cylinder 20 has an outwardly projecting cylinder rod 25 as seen in FIG. 1 which is attached to a portion of the injection head assembly 11. The cylinder rod 25 moves vertically with the piston of the cylinder 20 with the lowermost position of cylinder rod 25 being depicted in FIG. 1a.

As best seen in FIGS. 1a and 1b, a feed mechanism, generally indicated by the numeral 30 emanates from substantially the junction between the cylinder rod 25 and the injection head assembly 11. The feed mechanism 30 may be any of a wide variety of known feed-screws designed for use in injection molding machinery and may conveniently be oriented substantially perpendicularly of said cylinder rod 25. Such feed mechanism 30 includes an elongate barrel, generally indicated by the numeral 31 which contains an auger or screw (not shown) which supplies molding material at a controlled rate from right to left as viewed in FIG. 1a of the drawings. Molding material is conventionally supplied from an external source proximate the right-hand extremity of the elongate barrel 31 as viewed in FIG. 1a of the drawings. The auger or screw in the elongate barrel 31 is controllably intermittently driven in conventional fashion by a feed drive motor, generally indicated by the numeral 32 in FIG. 1b of the drawings.

Figure 6:
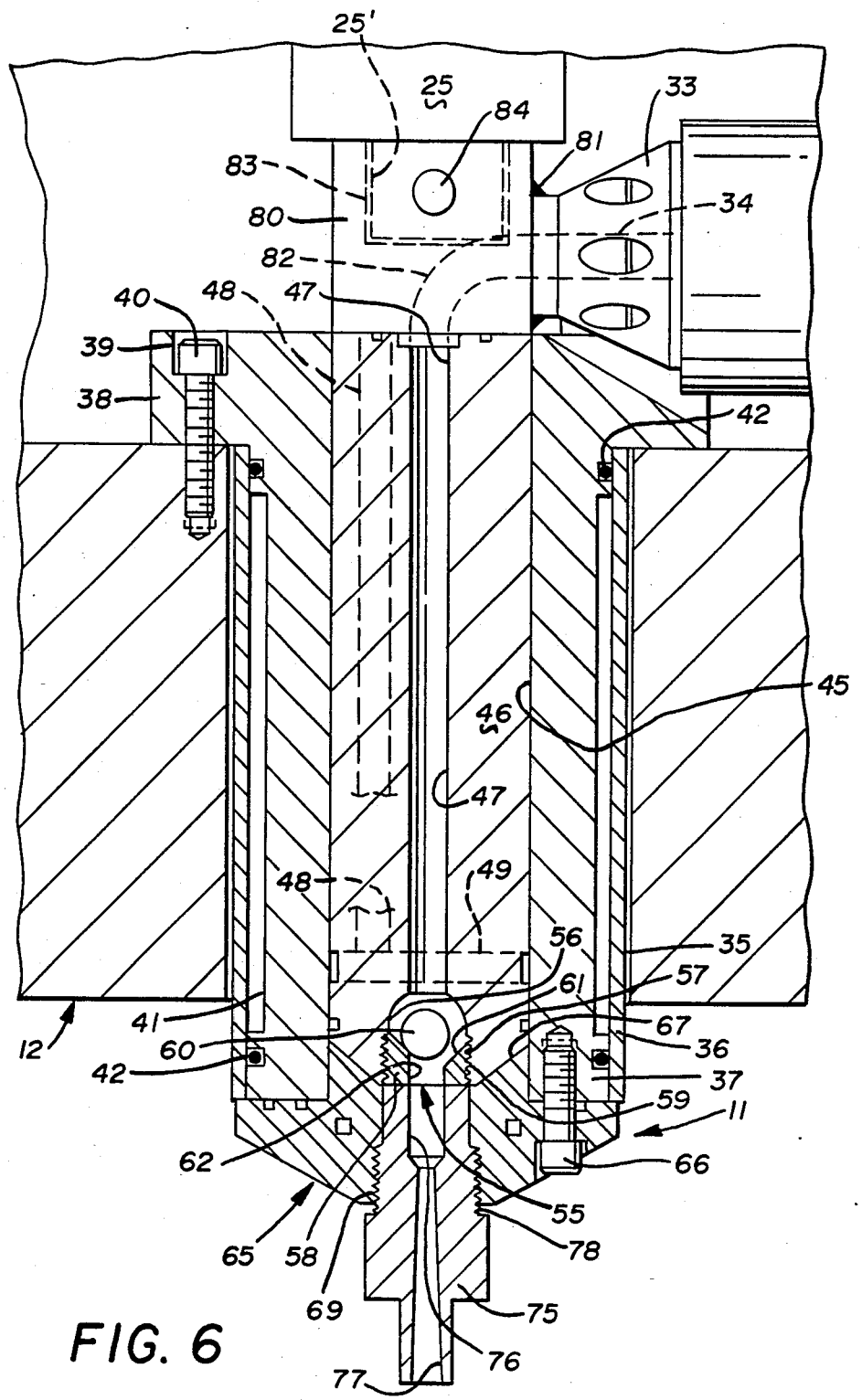
FIG. 6 is an enlarged fragmentary section view showing details of the injection head assembly.

The injection head assembly 11 as seen in FIGS. 1a and 6 of the drawings extends through a circular aperture 35 which is preferably positioned substantially centrally of the bolster 12. The aperture 35 receives an injection jacket 36 of the injection head assembly 11. Disposed concentrically within the injection jacket 36 is an injection barrel 37 which has a hub 38 at the upper extremity thereof which overlies the bolster 12. The hub 38 may be provided with suitable apertures 39 to receive cap screws 40 or other fasteners for securing the injection barrel 37 to the bolster 12. By means of example the injection barrel 37 may be provided with an annular cutout 41 providing a cavity inwardly of the injection jacket 36 through which temperature control fluid may be circulated in a manner well known to persons skilled in the art. Sealing rings 42 may be provided axially outwardly of the annular cutout 41 to preclude the escape of the temperature control fluid between the injection jacket 36 and the injection barrel 37.

The injection barrel 37 has an internal bore 45 which forms a cylindrical chamber interiorly of the injection barrel 37. Moving within the cylindrical chamber defined by the internal bore 45 is a plunger 46. The plunger 46 moves, as hereinafter described, reciprocally within the bore 45 from the position depicted in FIG. 6 to a vertically upwardly displaced position wherein the portion of the chamber formed by bore 45 therebelow is of the exact volume for a shot of molding material for the particular product being molded.

The plunger 46 is provided with a through bore 47 from which molding material is introduced to the chamber formed within internal bore 45 of injection barrel 37. The plunger 46 may in a manner which will be appreciated by persons skilled in the art be provided with suitable passageways internally thereof for the flow of temperature control fluid such as to effect a desired temperature of molding material passing through the bore 47 of plunger 46 at any point in time. In this respect the plunger 46 may be provided with a plurality of axial passages 48 which may substantially parallel the through bore 47 and which may be disposed in a circumferential pattern therearound to effect uniform heating characteristics. For purposes of effecting a circuitous flow of temperature control fluid one or more bores 49 may interconnect the axial passages 48.

The flow of molding material through the lower extremity of the bore 47 of plunger 46 is controlled by a valve assembly, generally indicated by the numeral 55. The valve assembly 55 is at the lower extremity of bore 47 of plunger 46 and may be formed in part by an enlarged counter bore 56 which is coaxial with the bore 47. The counter bore 56 has an internally threaded portion 57 which receives a ball retainer 58 which has external threads 59 for engaging the threads 57. The ball retainer 58 of valve assembly 55 captures a ball valve 60 within the counter bore 56. The ball valve 60 is of such a size that it blocks the juncture between bore 47 and counter bore 56 during the discharge of molding material thereby preventing molding material in the counter bore 56 from backing into the bore 47.

During the charging or filling of the chamber with molding material the ball valve 60 moves to the position depicted in FIG. 6, thereby permitting the flow of molding material from the bore 47 into the counter bore 56. The molding material then passes through one or more angularly disposed slots 61 in ball retainer 58 and into an outlet passage 62 in the ball retainer 58 and subsequently into the chamber in injection barrel 37 from bottom to top as the molding material entering the chamber progressively forces the plunger upwardly. The cylindrical chamber defined by internal bore 45 in injection barrel 37 is enclosed proximate to the lower end thereof depicted in FIG. 6 by an injection cap assembly, generally indicated by the numeral 65. The injection cap assembly 65 may be attached to the injection barrel 37 by a plurality of cap screws 66 or other fasteners which extend through the cap 65 and into injection barrel 37 as seen in FIG. 6. The injection cap assembly 65 is preferably contoured at its upper medial portion to have a beveled surface 67 which conforms with a mating surface of the injection plunger 46 such that during downward movement of the plunger 46 during the discharge cycle molding material within the chamber formed within injection barrel 37 is moved downwardly and centrally within the cap assembly 65.

The cap assembly 65 has a central bore 68 to receive a nozzle 75. The nozzle 75 has an input bore 76 which may be of the size of the output bore 62 of the ball retainer 58. The nozzle 75 may have an output bore 77 which is sized and configured for operative engagement with a particular mold configuration. The nozzle 75 may have external threads 78 over a portion thereof for mating engagement with internal threads 69 within the cap assembly 65. The molding material forced from the chamber within injection barrel 37 as confined by the cap assembly 65 is thus forced outwardly through the input bore 76 and output bore 77 of the nozzle 75. It is to be appreciated that the nozzle 75 may be unthreaded from the cap 65 for cleaning or for purposes of replacing the nozzle 75 with a similar nozzle of a different size or configuration.

The upper portion of plunger 46 opposite ball valve 60 is rigidly attached to a plunger adapter 80, as seen in FIGS. 1a, 2 and 6. The plunger adapter 80 also receives and rigidly mounts as by welds 81 a tapered head 33 attached to and constituting the end of the elongate barrel 31 of the feed mechanism 30. As best seen in FIG. 2 the tapered head 33 has an internal bore 34 for the passage of molding material which connects with a bore 82 in the plunger adapter 80. The bore 82 connects with bore 47 as seen in FIGS. 2 and 6 for the transmittal of molding material through the plunger 46. The cylinder rod 25 is also rigidly attached to the plunger adapter 80 as by a cylindrical projection 25' on cylinder rod 25 which extends into a mating recess 83 in adapter 80 and is affixed by a pin 84. Thus injection cylinder 20 controls the downward motion of the plunger 46 as well as the tapered head 33 of feed mechanism 30, all of which are rigidly interconnected.

As best seen in FIG. 2, the plunger adapter 80 may be provided with suitable fittings 85 to effect the ingress and egress of temperature control fluid within the passages 48 and bores 49 of the injection plunger 46. Similarly, fittings 86 may be employed to supply temperature control fluid to injection barrel 37 or into cavities which may be located between the injection jacket 36 and the injection barrel 37 as detailed hereinabove.

While the tapered head 33 at the left end of feed mechanism 30 as seen in FIG. 1a is vertically displaced with the plunger adapter 80 and the plunger 46, the elongate nature of feed mechanism 30 may produce an undesirable cantilever loading condition. This condition may be countered according to the present invention by the use of an auxiliary support mechanism, generally indicated by the numeral 90, seen generally in FIGS. 1a and 1b, which insures the precise translatory motion of the fee mechanism 30 perpendicular to the direction of movement of the plunger during the repeated reciprocatory motion of the plunger 46.

Figure 3:
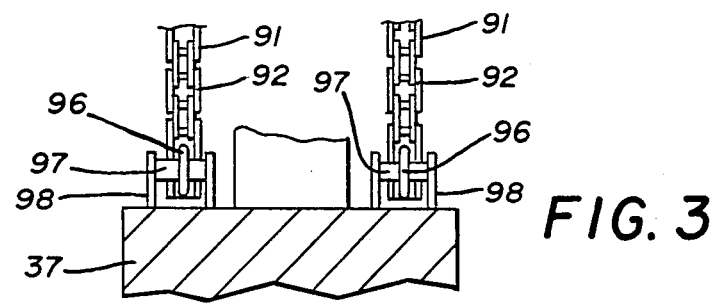
FIG. 3 is a side elevational view taken substantially along the line 3—3 of FIG. 1 depicting the mounting of the chain drive assembly proximate one extremity of the feedscrew mechanism.

The auxiliary support mechanism 90 as seen in part in each of FIGS. 1a, 1b and 2-5 of the drawings, consists of a pair of equal length roller chains 91 which have an equal number of individual chain links 92. One extremity of each of the roller chains 91 has a master link 93 which is attached to a chain bracket 94 which is adjustably fixed as by a nut 95 to the cylinder rod 25 of injection cylinder 20, as seen in FIG. 1a. The roller chains 91 thereafter interengage with idler sprockets 96 which are mounted on bushings 97 mounted in clevises 98 which are attached as by cap screws 99 to a fixed element such as the hub 38 at the upper extremity of the injection barrel 37 preferably to either side of the injection plunger 46 and plunger adapter 80, as best seen in FIGS. 2 and 3. From the clevises 98 the roller chains 91 extend substantially vertically upwardly to a pair of idler sprockets 100 which may conveniently be mounted from and interiorly of each of the side plates 16 and 17 (see FIG. 1a).

Figure 4:
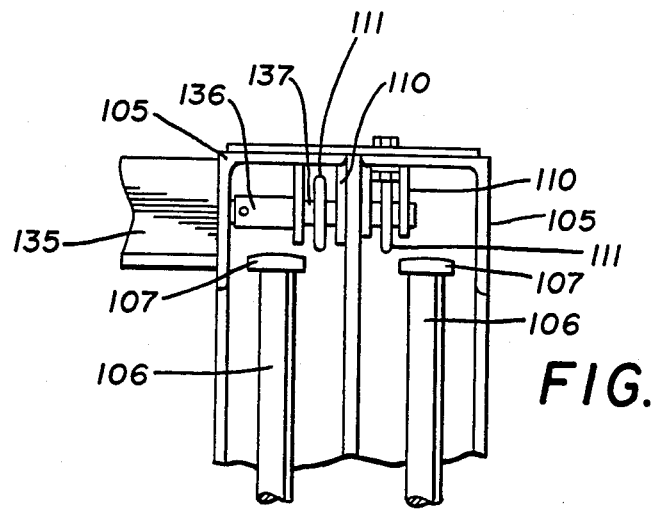
FIG. 4 is a side elevational view taken substantially along the line 4—4 of FIG. 1 and depicting suspension elements for the chain drive assembly.

As best seen in FIGS. 1a, 1b and 4, cantilever support arms 105 may extend outwardly as from the side plates 16 and 17 proximate the head end 21 of the cylinder 20 for suspending additional elements of auxiliary support mechanism 90. Each of the cantilever support arms 105 may be supported a distance outwardly from side plates 16 and 17 by a pair of fixedly mounted upright shafts 106. Each of the shafts 106 has an adjustment nut 107 proximate the upper extremity thereof which may be attached to the support arms 105 as by weldments 108, as best seen in FIGS. 1a and 4. The support arms 105 mount proximate their extremities a pair of clevises 110, one for each of the roller chains 91. The clevises 110 may be similar to the clevises 98 in mounting idler sprockets 111 which engage the links 92 of the two roller chains 91. As seen in comparing FIG. 4 and FIG. 3, the distance between the clevises 110 and the sprockets 111 may be substantially reduced as compared with the spacing proximate the adapter 80.

Figure 5:
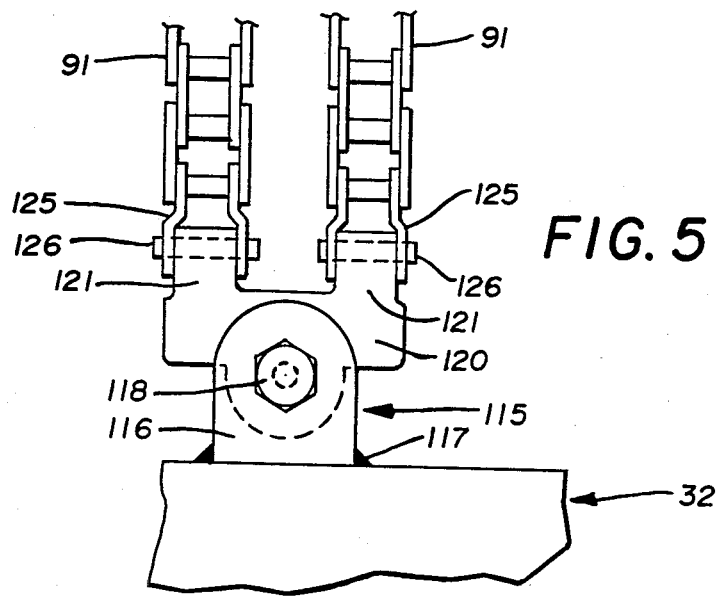
FIG. 5 is a fragmentary top plan view taken substantially along the line 5—5 depicting particularly the attachment of the chain drive assembly at another location along the feedscrew mechanism.

The roller chains 91 are directed downwardly from the extremity of the support arms 105 by idler sprockets 111 and terminate in a force balancing swivel, generally indicated by the numeral 115, as best seen in FIGS. 1b and 5. The force balancing swivel 115 consists of a base 116 which may be mounted at a convenient location on the feed drive motor 32 as by weldments 117. The base 116 pivotally mounts a yoke 120 on a pin or bolt 118 extending therethrough. The yoke 120 has a pair of upstanding arms 121 which engage a master link 125 and pins 126 at the second extremity of each of the roller chains 91. It will thus be appreciated that self-balancing of the forces between the two roller chains 91 will be effected by such pivoting of yoke 120 as may be necessitated about pin 118.

In addition to the support of the feed mechanism 30 by the auxiliary support mechanism 90 during its translatory motion, the auxiliary support mechanism 90 may also provide lateral stability for feed mechanism 30. As shown particularly in FIG. 1a, the elongate barrel 31 of feed mechanism 30 may rigidly mount a sleeve 130 which encircles one of the shafts 106. The sleeve 130 and the feed mechanism 30 is thus guided and stabilized during the translatory motion of the feed mechanism 30 as effected by the auxiliary support mechanism 90.

If desired, the extent of upward travel of the plunger 46 as a determinant of the size of the shot of molding material to be dispensed may be controlled as an ancillary function of the auxiliary support mechanism 90. As shown by way of example in FIG. 4, an encoder 135 may be positioned proximate the idler sprockets 111. The encoder 135 may have an encoder shaft 136 attached to the shaft 137 of one of the idler sprockets 111. The extent of movement of the roller chains 91 as converted to a rotational value by encoder 135 may be employed through suitable controls (not shown) connected to feed mechanism 30 to control the upward displacement of the plunger 46. This linear displacement of plunger 46 which directly relates to a particular volume of the chamber within barrel 37, the determinant of the size of the shot of molding material for a particular molding operation.

Thus it should be evident that the injection molding apparatus disclosed herein carries out the various objects of the invention set forth hereinabove and otherwise constitutes an advantageous contribution to the art. As may be apparent to persons skilled in the art, modifications can be made to the preferred embodiment disclosed herein without departing from the spirit of the invention, the scope of the invention being limited solely by the scope of the attached claims.

I claim:

1. Injection molding apparatus for processing and transferring molding material from a feed mechanism to a nozzle for discharging into a mold comprising, bolster means, injection head means extending through said bolster means, injection barrel means in said injection head means for containing a predetermined sized shot of the molding material, plunger means movable in said injection barrel means for discharging the shot of molding material into the mold, bore means extending longitudinally within said plunger means for loading molding material into said barrel means, feed means communicating with and supplying molding material to said bore means at the end of said plunger means opposite the nozzle, said feed means being an elongate body disposed substantially perpendicular to the direction of movement of said plunger means, and valve means closing said bore means upon movement of said plunger means in one direction for discharging the shot of molding material and opening said bore means upon movement of said plunger means in the other direction for charging said barrel means with a predetermined shot of molding material.

2. Apparatus according to claim 1, wherein said bore means extends axially through said plunger means.

3. Apparatus according to claim 1, wherein said feed means is attached to and moves with said plunger means.

4. Apparatus according to claim 3, including auxiliary drive means supporting said feed means at a location displaced from said plunger means to maintain said feed means substantially perpendicular to the direction of movement of said plunger means.

5. Apparatus according to claim 4, wherein said feed means includes a feedscrew and a drive motor for selectively driving said feedscrew.

6. Apparatus according to claim 1, including plunger adapter means interconnecting said plunger means and said feed means for supplying molding material from said feed means to said bore means of said plunger means.

7. Apparatus according to claim 6, wherein cylinder means moves said plunger means for discharging the shot of molding material, said cylinder means having piston rod means attached to said plunger adapter means.

8. Apparatus according to claim 1, wherein said injection barrel means, said plunger means and a cap mounting the nozzle have passage means for the circulation of temperature control medium for controlling the temperature of the molding material in said injection head means.

9. Apparatus according to claim 1, wherein said valve means is a ball valve positioned in an enlarged counter bore formed coaxially with said bore means in said plunger means.

10. Apparatus according to claim 9, wherein a ball retainer maintains said ball valve in said counter bore, said ball retainer having slot means passing molding material for charging said barrel means progressively from the nozzle during the charging of said barrel means with a predetermined shot.

11. Apparatus according to claim 10, including an injection cap assembly attached to said injection barrel means closing the chamber in said injection barrel means and mounting the nozzle.

12. Injection molding apparatus for processing and transferring molding material from a feed mechanism to a nozzle for discharging into a mold comprising, bolster means, injection head means extending through said bolster means, injection barrel means in said injection head means for containing a predetermined sized shot of the molding material, plunger means movable in said injection barrel means for discharging the shot of molding material into the mold, means in said plunger means for loading molding material into said barrel means, feed means attached to said plunger means supplying molding material to said means in said plunger means for loading molding material during movement of said plunger means for charging said barrel means, and auxiliary support means for said feed means insuring precise translatory motion of said feed means.

13. Apparatus according to claim 12, wherein said auxiliary support means includes roller chain means attached to said plunger means and to said feed means a distance displaced from where said feed means is attached to said plunger means.

14. Apparatus according to claim 13, wherein said roller chain means is supported by a plurality of fixed idler sprockets.

15. Apparatus according to claim 14, wherein said roller chain means includes a pair of roller chains with one extremity of said roller chains being attached to a force balancing swivel for equalizing forces in said roller chains.

16. Apparatus according to claim 15, wherein some of said idler sprockets are mounted on cantilever support arms extending in the direction of said feed means.

17. Apparatus according to claim 16, wherein said support arms are reinforced by upright shafts, said feed means having an attached sleeve means for slidably engaging at least one of said shafts for stabilizing said feed means during the translatory motion.

18. Apparatus according to claim 12, wherein said auxiliary support means has moving roller chain means driving encoder means for controlling said feed means and thus the upward movement of said plunger means for determining the size of the shot of molding material to be charged in said injection barrel means.

* * * * *